March 23, 1937.  F. G. FUNK  2,074,383
EGG HANDLING MACHINE
Filed June 22, 1934  3 Sheets-Sheet 1
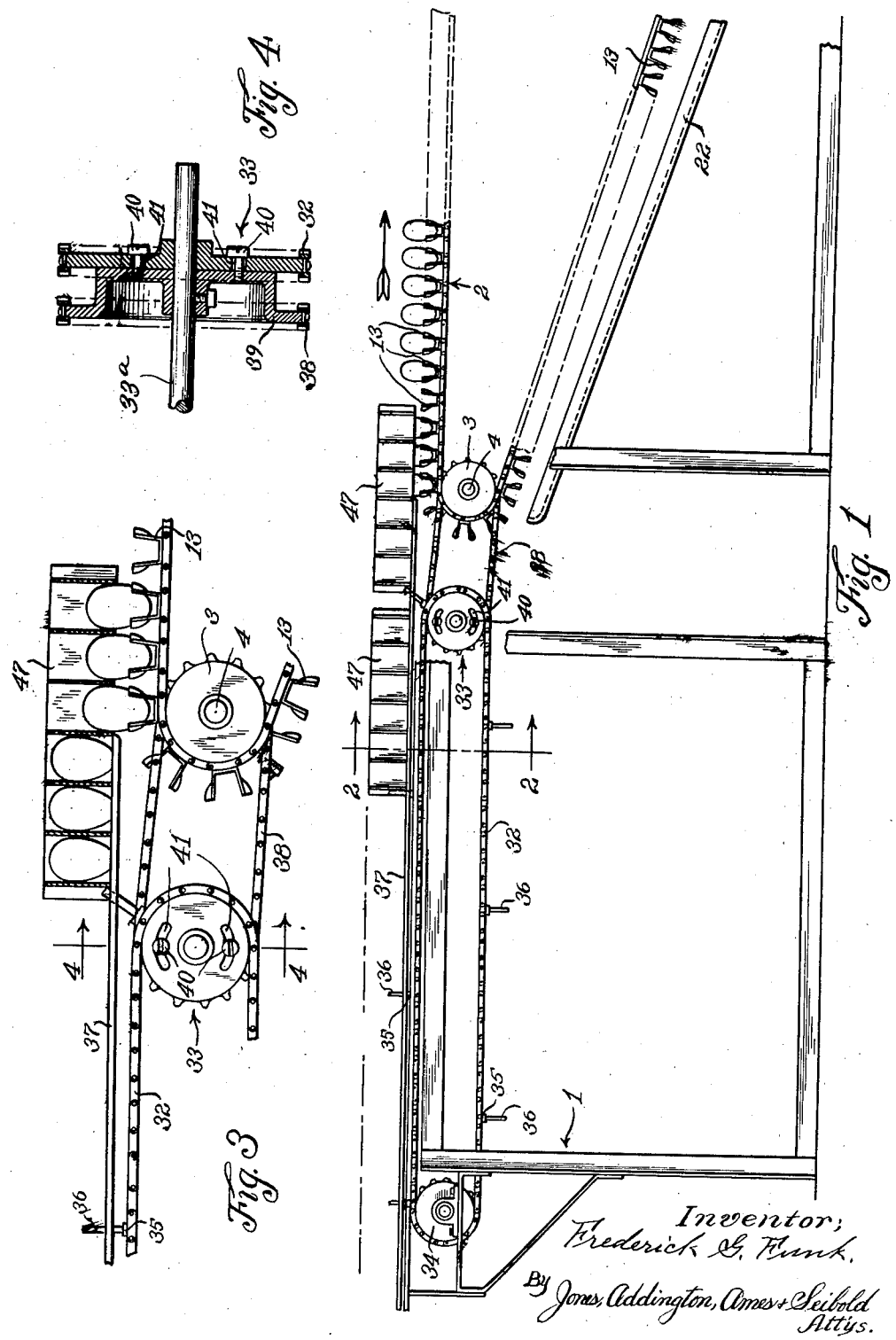
Inventor;
Frederick G. Funk.
By Jones, Addington, Ames + Seibold
Attys.

March 23, 1937.  F. G. FUNK  2,074,383
EGG HANDLING MACHINE
Filed June 22, 1934  3 Sheets-Sheet 2
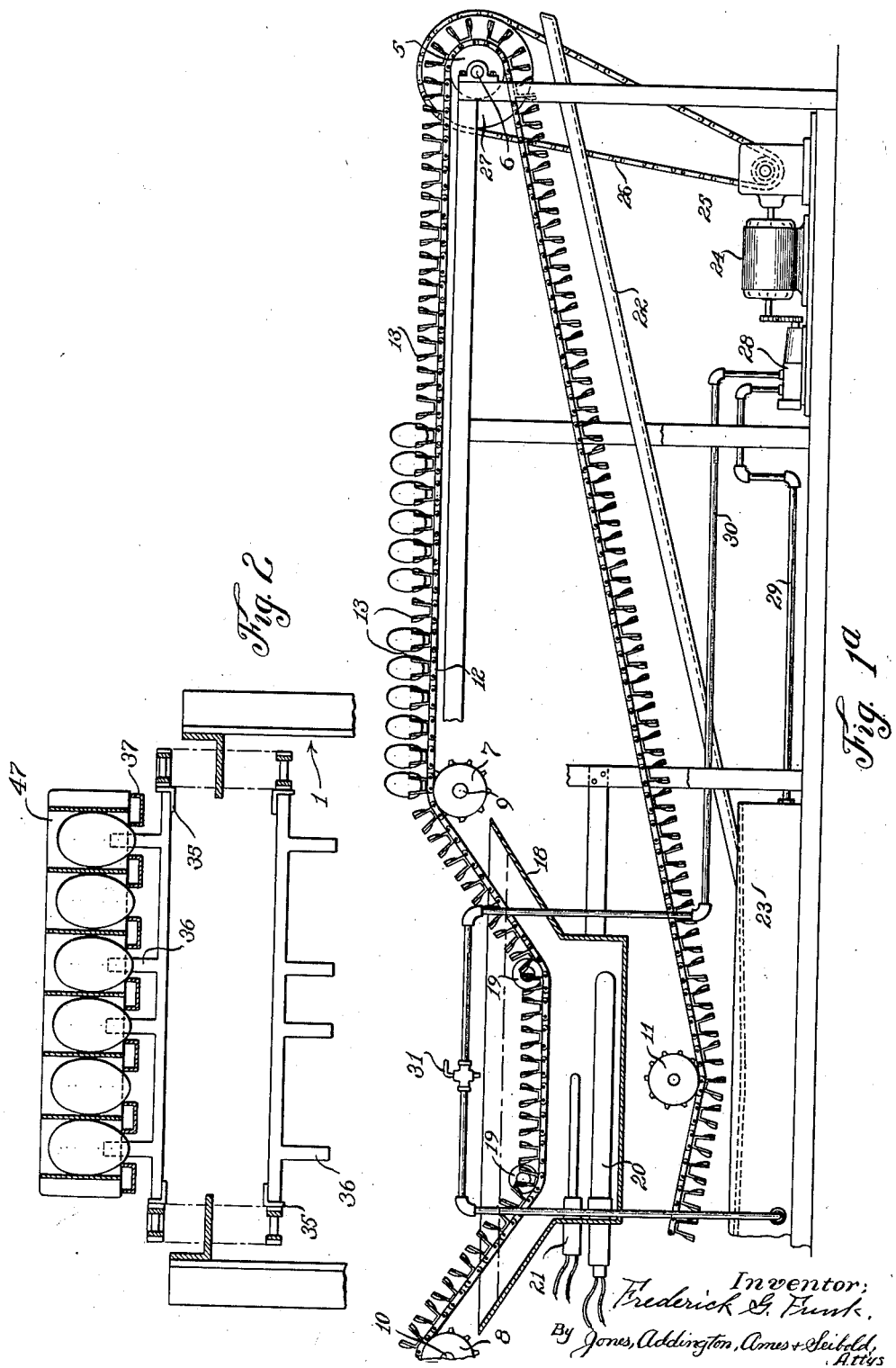

March 23, 1937.   F. G. FUNK   2,074,383
EGG HANDLING MACHINE
Filed June 22, 1934   3 Sheets-Sheet 3

Inventor;
Frederick G. Funk.
By Jones, Addington, Ames & Seibold,
Attys.

Patented Mar. 23, 1937

2,074,383

UNITED STATES PATENT OFFICE 2,074,383

EGG HANDLING MACHINE

Frederick G. Funk, Chicago, Ill., assignor to Globe Egg Stabilizing Company, Chicago, Ill., a corporation of Illinois Application June 22, 1934, Serial No. 731,815

4 Claims. (Cl. 214—1.1)

This invention relates to egg handling machines and more particularly to machines for processing eggs wherein the machine is arranged to pass the eggs through a processing solution for the purpose of preserving the eggs indefinitely.

This application is a continuation in part of my prior application, Serial No. 563,335, filed September 17, 1931.

The embodiment disclosed herein includes means whereby the solution may be kept at a suitable temperature and a desired predetermined level of the solution may be maintained.

The device is also arranged to return the solution drained from the eggs and the supporting conveyor to the processing tank whereby a desired liquid level may be maintained therein.

It is an object of the invention to provide a conveyor for continuously conveying eggs through a solution and means cooperating therewith whereby eggs may be substantially continuously delivered to the conveyor directly from egg crate fillers.

A further object is the provision of a particular type of conveyor having flights thereon whereby the eggs may be automatically delivered from egg crate fillers and be maintained in the same relative position on the conveyor as in the fillers.

It has been common practice to use endless conveyor belts for carrying eggs through tanks containing various solutions. However, these devices have been unsatisfactory, as ordinarily they have not been arranged for continuous processing, but are intended to carry containers, such as wire baskets or other devices, which contain a number of eggs, the baskets being spaced on the conveyor. Any attempt to support the eggs directly on the conveyor has been unsatisfactory due to the fact that it has been difficult to provide suitable supports or seats for the eggs and to efficiently load the eggs on the conveyor and remove them therefrom.

The present invention overcomes the above objections and provides an egg processing machine in which filled egg crate fillers may be continuously supplied at the receiving end of the machine, and the eggs will be automatically delivered to the conveyor and maintained thereon in substantially the same relative position and alignment as in the fillers, and wherein the eggs may be rapidly and efficiently removed from the machine by an operator in a manner to completely fill a filler at each removal operation.

Further objects will be apparent from the specification and the appended claims.

In the drawings:

Figure 1 is a side elevation of the receiving or loading end of the machine, a portion being broken away for purposes of illustration.

Fig. 1a is a continuation of Fig. 1 and illustrates the processing and discharge portion of the machine.

Fig. 2 is a transverse section through the receiving end of the machine and taken on a line substantially corresponding to line 2—2 of Fig. 1.

Fig. 3 is an enlarged view of the egg delivering mechanism.

Fig. 4 is a transverse section through the synchronizing means and taken on a line corresponding to line 4—4 of Fig. 3.

Figure 5:
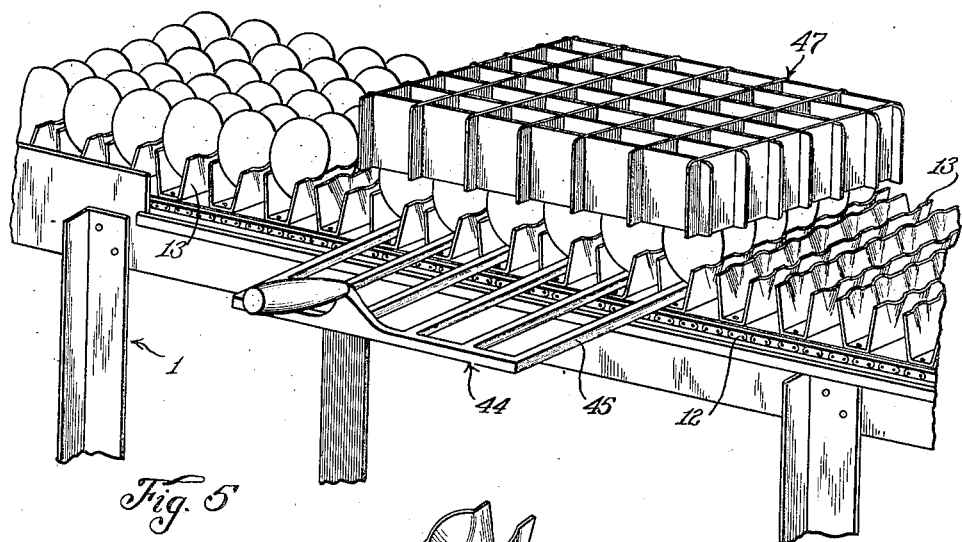
Fig. 5 is a view showing the manner in which eggs are removed from the conveyor.

Referring to the drawings in detail, the embodiment illustrated comprises a frame 1. This frame preferably comprises two side frames made of angle irons and secured together by suitable cross braces. An endless conveyor 2 is mounted on spaced sprockets 3 secured to a shaft 4, which latter is rotatably mounted adjacent the receiving end of the frame, and sprockets 5 on a shaft 6 at the discharge end of the machine. The intermediate portions of the conveyor are guided on sprockets 7 and 8 on shafts 9 and 10 respectively. Idler sprockets 11 are also mounted to guide the lower portion of the conveyor as indicated in Fig. 1a. These sprockets may be adjustably mounted for tightening the conveyor if desired.

Figure 6:
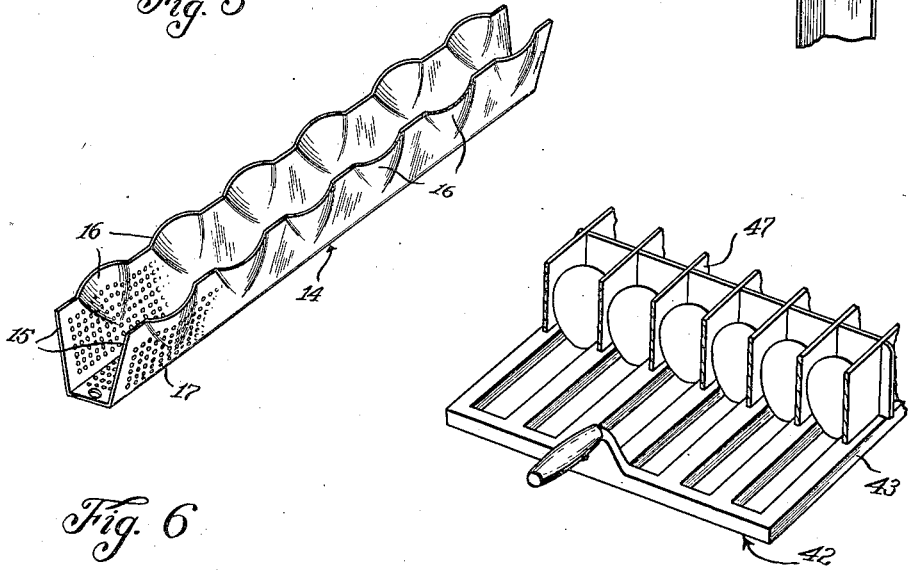
Fig. 6 is a detailed view of a conveyor flight.

The conveyor comprises spaced chains 12 which are in engagement with the sprockets and may be guided on suitable tracks if desired. Spaced egg-holding flights 13 are mounted on the conveyor chains, and in the embodiment shown, comprise U-shaped sheet metal members 14 (Fig. 6) which may be made of sheet metal, preferably aluminum, and secured at their ends to the chains 12. The upwardly extending arms 15 of the flights 14 are formed to provide concave portions 16 forming egg seats, and these egg seats are spaced to conform to a row of compartments in a standard egg crate filler and to maintain the eggs upright in the seats; that is, with their long axis vertical, whereby, when an egg filler is placed over the flight with a row of compartments in alignment with the egg seats, the eggs will drop therein and remain in the same position in which they were held in the compartments. The flights are preferably perforated as shown at 17 whereby any processing liquid removed from the processing tank may be drained therefrom.

A processing tank 18 is mounted intermediate the ends of the conveyor and the conveyor is guided downwardly therethrough by means of rollers 19. This tank is provided with electrical heating elements 20 which are so connected in an electrical circuit as to be automatically controlled by means of a thermostat 21. This thermostat also extends into the liquid, and suitable connections are made for controlling an electrical switch, which, in turn, controls the heaters and the solution is thereby maintained at a desired predetermined temperature.

Suitable drain members 22 are mounted underneath the conveyor and arranged to direct liquid, removed from the processing tank by the conveyor, into a drain tank 23 preferably located below the processing tank.

A motor 24 is mounted at the base of the machine adjacent the end, as shown in Fig. 1a, and arranged to drive the egg conveyor through a speed reduction mechanism 25 connected to the conveyor by means of a chain 26 and a sprocket 27 on the shaft 6. A pump 28 is mounted adjacent the motor and continuously driven therefrom, and is connected to the drain tank by suitable conduits 29 and 30. These conduits, including the pump drain tank, provide a circulating system, and the liquid is drawn from the drain tank through the conduit 29 and the pump 28 and returns through the conduit 30 to the drain tank. The conduit 30 extends upwardly to a position above the drain tank and is provided with a valve 31 which is adjustable to allow any desired amount of liquid to pass from the circulating system into the processing tank to replace liquid removed therefrom by the conveyor. By this means a predetermined level of the processing liquid may be constantly maintained.

The transverse flights 14 on the conveyor are spaced to position the egg seats in such a manner that they continuously conform to the compartments of egg crate fillers, whereby when a filler is placed thereover all of the compartments will be in alignment with corresponding egg seats.

The egg conveyor is continuously moved in the direction of the arrow in Fig. 1, and a loading conveyor device is provided including spaced conveyor chains 32 mounted on suitable sprockets 33 and 34, and having spaced transverse flights 35 thereon which are spaced to receive filled egg crate fillers therebetween. The flights 35 are provided with upwardly extending arms 36 which are arranged to engage the fillers and move them toward the egg conveyor.

Filler supports 37 are mounted above the loading conveyor, and these supports comprise longitudinal rods preferably U-shaped channels such as illustrated in cross section in Fig. 2. The channels are so spaced above the loading conveyor that the flight arms 36 pass therebetween and engage the side of the filler when it is placed thereon. When a filled egg crate filler is placed on these channels, the eggs are supported on, and between, the channels as illustrated. The loading conveyor is driven from the egg conveyor by means of intermediate chains 38 on suitable sprockets on the shaft 4 of the egg conveyor and sprockets 39 (Fig. 4) on the shaft 33a on which the sprockets 33 are also mounted.

The sprockets 39 are rigidly secured to the shaft 33a, and the sprockets 33 are adjustably secured to the sprockets 39 by means of screws 40 in suitable slots 41. By this adjusting means, relative movement of the flights of the cooperative conveyors may be synchronized to cause the compartments of egg fillers moved by the loading conveyor to align with the egg seats on the egg conveyor. The egg supporting rods or channels 37 of the loading device extend somewhat beyond the loading conveyor and over the egg conveyor adjacent to the moving seats thereon, so that the fillers on the loading conveyor will be consecutively pushed over the egg conveyor.

Figure 7:
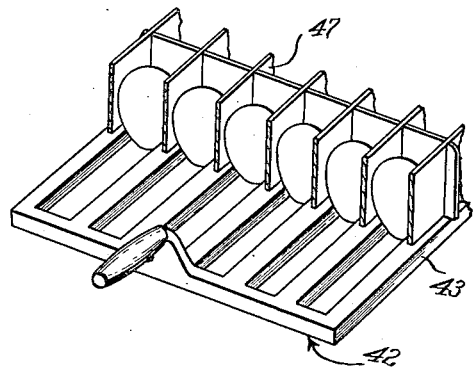
Fig. 7 is a view showing the manner in which filled egg crate fillers might be removed from an egg crate.

In operating the device, a filled egg crate filler may be removed from an egg crate by means of a seven-tined fork 42 inserted thereunder as illustrated in Fig. 7. By this means the eggs are supported between the tines 43 of the fork, and the filler is supported thereon. This fork and filler thereon are then placed transversely on the filling conveyor between the flights 35, and the arms on the flights will move the filler toward the egg conveyor as illustrated in Fig. 1. The arms 36 on the flights are so positioned as to extend upwardly between the egg supporting rods 37 to move the container synchronously with the flights on the egg conveyor so that, as the egg flights arrive in alignment with the ends of the egg supporting rods 37, a transverse row of egg compartments will be in alignment over the egg seats and the eggs will drop therein.

The arms 36 are arranged to push the fillers until three transverse rows of eggs are dropped into their corresponding seats, and the eggs in the seats will then extend partially into the compartments and will then serve to pull the filler completely onto the egg conveyor, thereby depositing all of the eggs from the filler into their corresponding seats. The filler is then removed from the eggs and the eggs are carried through the processing solution in the manner previously described, and outwardly on the discharge end of the conveyor. At this discharge end a filler may be placed over the eggs and a six-tined fork 44 is inserted under the eggs as illustrated. The tines 45 of the fork pass directly under the eggs and through the unobstructed opening between the eggs and the bottom of the U-shaped egg flights 14. When the fork 44 is completely inserted, it may be raised, thereby raising the eggs into the filler 47 and the filler with the processed eggs therein may be replaced in an egg crate.

By means of the invention herein disclosed, filled egg fillers may be continuously and consecutively placed on the loading conveyor, and the eggs will be automatically transferred to the egg conveyor and processed, and may then be consecutively and continuously removed therefrom and returned to the egg crates.

Modifications may be made in the embodiment herein illustrated and described, and it is therefore desired that the invention be limited only by the prior art and the scope of the appended claims.

Having thus described this invention what is claimed and desired to be secured by Letters Patent is:

1. An egg conveyor flight comprising an elongated sheet metal member substantially U-shaped in cross section, the arms being formed to provide spaced egg seats.

2. An egg conveyor comprising a carrier having spaced transverse flights thereon, said flights comprising spaced U-shaped members transversely mounted on said carrier, said members having egg seats therein and positioned to receive eggs by gravity from a filled egg crate filler when it is placed thereover, said flights being arranged to support the eggs with an unobstructed passage under each transverse row to receive a fork tine.

3. An egg handling machine comprising a stationary support for filled egg crate fillers, means for moving consecutive fillers to extend beyond the edge of said support whereby one or more rows of eggs will drop therefrom, means for moving consecutive transverse rows of egg seats under the overhanging fillers and at substantially the same speed whereby the eggs will drop row by row into said seats, said seats being so related to said support that one or more of the first rows dropped into said seats will cause the filler to continue its movement from said support whereby the remaining rows of eggs in said filler will drop into successively positioned rows of seats.

4. An egg handling machine comprising an endless conveyor, a stationary support adjacent said conveyor and extending beyond one end thereof, spaced means on said conveyor adapted to push filled egg crate fillers consecutively to overhang said support whereby one or more transverse rows of eggs will drop therefrom, means for consecutively positioning transverse rows of seats under the overhanging pockets to receive the eggs therefrom and adapted to support the eggs partly in said filler whereby the continued movement of the dropped eggs will move the filler completely from said support and cause the remaining rows to be dropped into corresponding successively positioned seats.

FREDERICK G. FUNK.